United States Patent
Chang

(10) Patent No.: US 8,477,110 B2
(45) Date of Patent: Jul. 2, 2013

(54) DRIVING CIRCUIT FOR DRIVING A LIQUID CRYSTAL DISPLAY PANEL

(75) Inventor: Yaw-Guang Chang, Sinshih Township, Tainan County (TW)

(73) Assignee: Himax Technologies Limited, Sinshih Township, Tainan County (TW)

(*) Notice: Subject to any disclaimer, the term of this patent is extended or adjusted under 35 U.S.C. 154(b) by 33 days.

(21) Appl. No.: 12/983,976

(22) Filed: Jan. 4, 2011

(65) Prior Publication Data

US 2012/0169615 A1 Jul. 5, 2012

(51) Int. Cl.
*G06F 3/041* (2006.01)

(52) U.S. Cl.
USPC ......................... 345/173; 178/18.01

(58) Field of Classification Search
USPC ............. 345/173–178, 156; 178/18.01–18.11
See application file for complete search history.

(56) References Cited

U.S. PATENT DOCUMENTS

| | | | | |
|---|---|---|---|---|
| 5,359,156 A | * | 10/1994 | Chan et al. | 178/20.02 |
| 5,841,427 A | * | 11/1998 | Teterwak | 345/173 |
| 5,859,392 A | * | 1/1999 | Petty | 178/18.01 |
| 5,902,967 A | * | 5/1999 | Teterwak | 178/18.01 |
| 5,940,065 A | * | 8/1999 | Babb et al. | 345/178 |
| 7,663,607 B2 | * | 2/2010 | Hotelling et al. | 345/173 |
| 8,125,463 B2 | * | 2/2012 | Hotelling et al. | 345/173 |
| 2001/0037182 A1 | * | 11/2001 | Hall et al. | 702/104 |
| 2006/0097991 A1 | * | 5/2006 | Hotelling et al. | 345/173 |
| 2006/0119590 A1 | * | 6/2006 | Park et al. | 345/175 |
| 2008/0006453 A1 | * | 1/2008 | Hotelling | 178/18.06 |
| 2008/0007539 A1 | * | 1/2008 | Hotelling | 345/173 |
| 2009/0066670 A1 | * | 3/2009 | Hotelling et al. | 345/174 |
| 2009/0085894 A1 | * | 4/2009 | Gandhi et al. | 345/175 |
| 2009/0096757 A1 | * | 4/2009 | Hotelling et al. | 345/173 |
| 2009/0096758 A1 | * | 4/2009 | Hotelling et al. | 345/173 |
| 2012/0001857 A1 | * | 1/2012 | Chang | 345/173 |

* cited by examiner

*Primary Examiner* — Dmitriy Bolotin
(74) *Attorney, Agent, or Firm* — McClure, Qualey & Rodack, LLP

(57) ABSTRACT

A sensing device for sensing a touch panel. The sensing device includes a touch sensor and a touch controller. The touch sensor senses touch events on the touch panel to generate raw data representing sensed values of the pixels on the touch panel, and further filters the raw data to generate filtered data. The data size of the filtered data is smaller than the data size of the raw data. The touch controller receives the filtered data from the touch sensor and processes the filtered data so as to determine positions of the touch events on the touch panel.

10 Claims, 4 Drawing Sheets

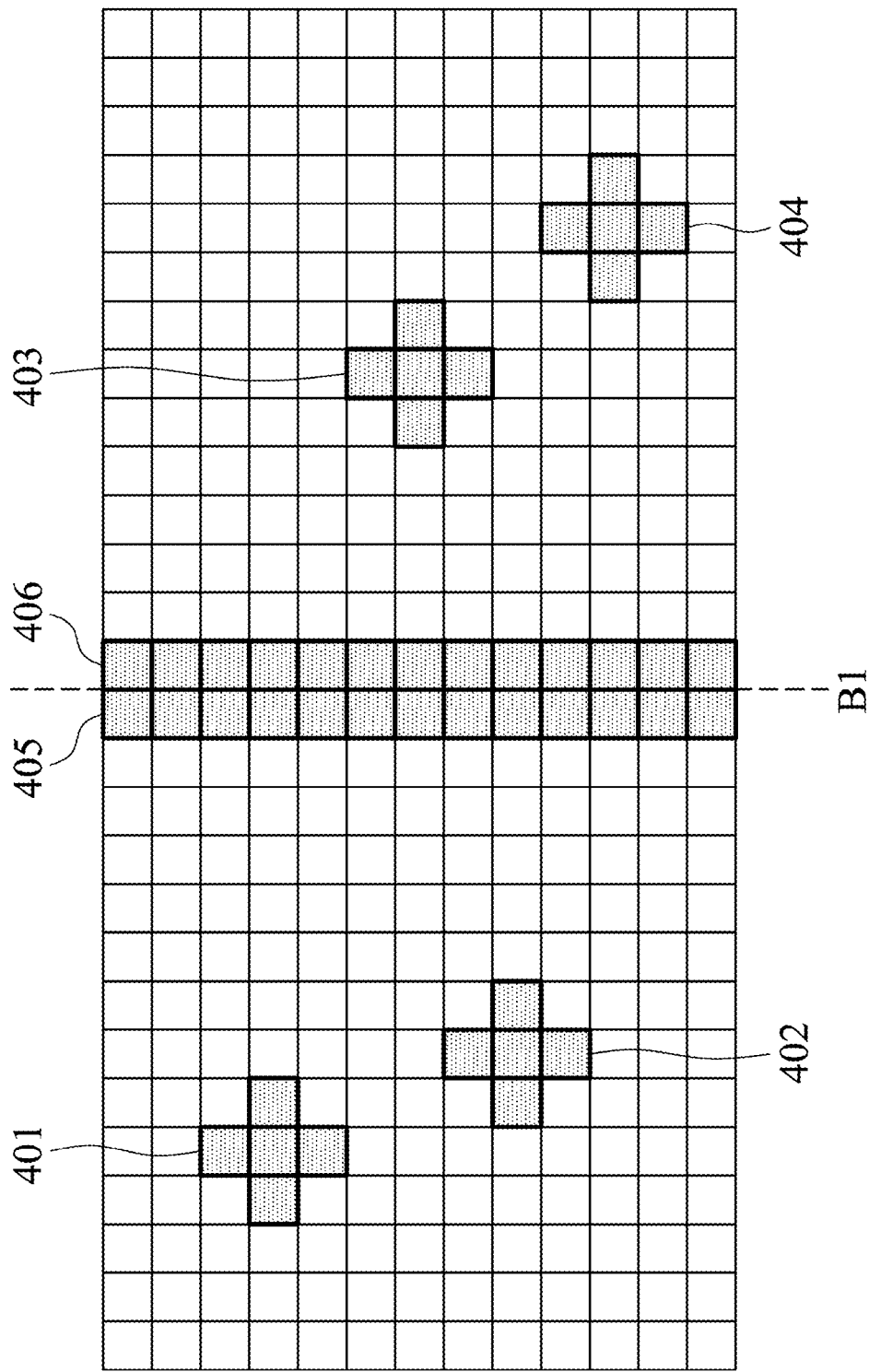

DRIVING CIRCUIT FOR DRIVING A LIQUID CRYSTAL DISPLAY PANEL

BACKGROUND OF THE INVENTION

1. Field of the Invention

The invention relates to a sensing device, and more particularly to a sensing device for sensing a large size touch panel.

2. Description of the Related Art

Electronic displays are widely used in many aspects of life. In the past, the use of electronic displays has been primarily limited to computing applications such as desktop computers and notebook computers. However, now, electronic displays are used in a wide variety of applications. For example, it is now common to see electronic displays being applied in gaming machines, automotive navigation systems, hand-held data organizers, and other devices.

Interactive visual displays often include some form of touch sensitive screen, such as a touch panel. Nowadays, integrating a touch panel in an electronic device is becoming more common for portable multimedia devices. As the size of a touch panel increases, the amount of sensed data obtained by the touch sensor integrated circuits (IC) for detecting touch events of the touch panel increases, accordingly. However, the throughput of transmission lines utilized for transferring the sensed data is limited. For example, the data rate of transferring digitalized sensed data for a 40×25 resolution the touch panel is 40(X axis)*25(Y axis)*60(scan rate)*16(ADC resolution)=960 Kbits/sec, but the maximum speed of an I2C (Inter-Integrated Circuit) interface is 400 Kbits/sec.

Therefore, a novel sensing module for sensing a large size touch panel is highly required.

BRIEF SUMMARY OF THE INVENTION

A sensing device and sensing module for sensing a touch panel are provided. An exemplary embodiment of a sensing device comprises a touch sensor and a touch controller. The touch sensor senses touch events on the touch panel to generate raw data representing sensed values of the pixels on the touch panel, and further filters the raw data to generate filtered data. The data size of the filtered data is smaller than the data size of the raw data. The touch controller receives the filtered data from the touch sensor and processes the filtered data so as to determine positions of the touch events on the touch panel.

An exemplary embodiment of a sensing module for sensing a touch panel comprises a plurality of touch sensors. Each touch sensor senses a plurality of touch events on the touch panel and comprises a sensing element, an analog to digital converter (ADC) and a signal processing unit. The sensing element senses the touch events to generate a plurality of sensed values of a plurality of pixels on the touch panel. The ADC converts the sensed values from an analog format to a digital format to generate raw data representing the sensed values. The signal processing unit processes the raw data and filters out a portion of the raw data with the corresponding sensed values which are less than a predetermined threshold to obtain filtered data. The data size of the filtered data is smaller than the data size of the raw data.

Another exemplary embodiment of a sensing module for sensing a touch panel comprises a plurality of touch sensors, each for sensing a plurality of touch events on the touch panel to generate raw data representing a plurality of sensed values of a plurality of pixels on the touch panel, and further filter the raw data to generate filtered data. The data size of the filtered data is smaller than the data size of the raw data, and one of the plurality of touch sensors further receives the filtered data from other touch sensor(s), and processes the filtered data to determine positions of the touch events on the touch panel.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein:

FIG. 4 shows a schematic diagram of touched pixels on a touch panel according to an embodiment of the invention.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
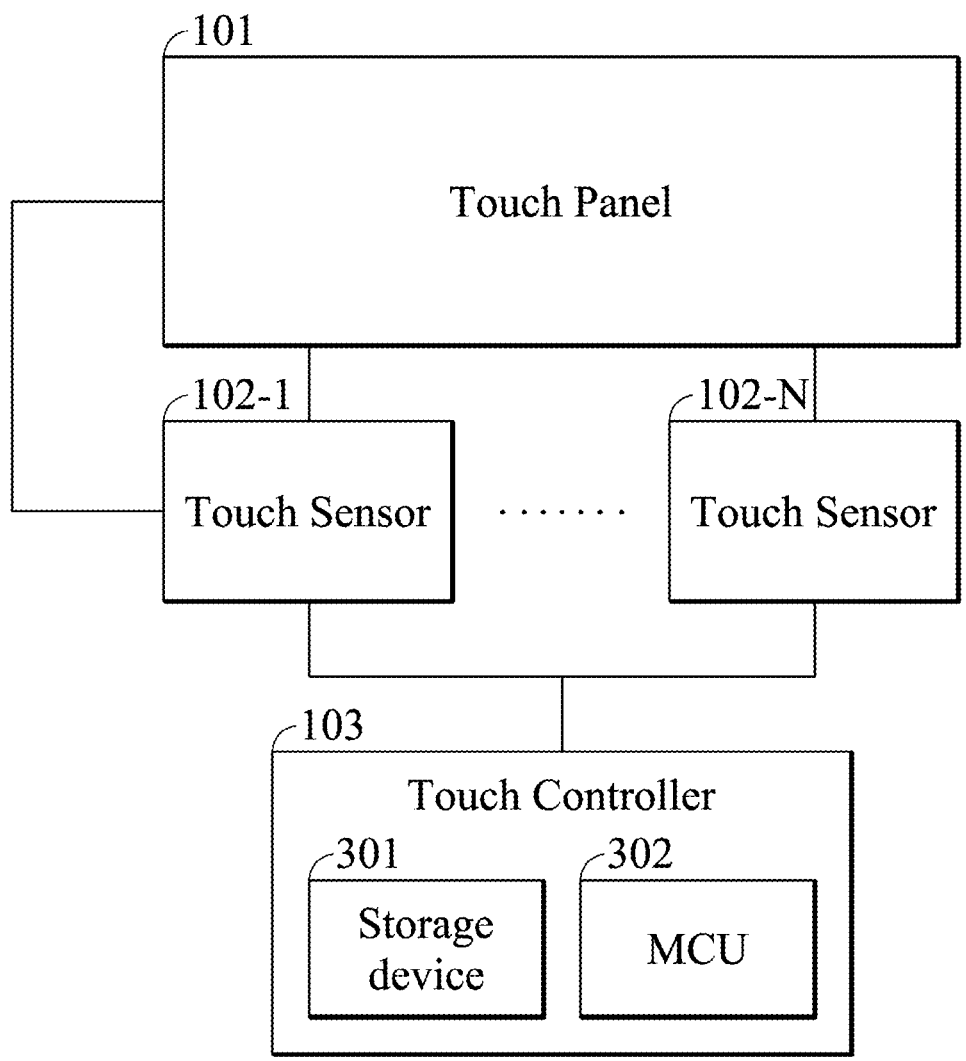
FIG. 1 is a block diagram showing a display system according to an embodiment of the invention.

FIG. 1 is a block diagram showing a display system according to an embodiment of the invention. The display system 100 comprises a touch panel 101 and a sensing device for sensing touch events on the touch panel 101. The sensing device may comprise a sensing module and a touch controller 103. The sensing module may comprise one or more touch sensors 102-1 to 102-N, where N is a positive integer. In one embodiment of the invention, when the touch panel 101 is a large-sized touch panel, multiple touch sensors may be cascaded as shown in FIG. 1, and each may be arranged to sense a portion of the pixels of the touch panel 101. For example, two touch sensors may be cascaded together for sensing of the touch panel 101, where one may be utilized for sensing one half of the pixels located at the right hand side of the touch panel 101 and the other one be utilized for sensing another half of the pixels located at the left hand side of the touch panel 101. Note that in other embodiments of the invention, the number of touch sensors and coupling methods of the touch sensors may be flexibly designed and the invention should not be limited thereto.

According to an embodiment of the invention, the touch sensors 102-1 to 102-N may be operable to sense a plurality of touch events on the touch panel 101 to generate raw data representing a plurality of sensed values of the pixels on the touch panel 101. Note that conventionally, the touch sensors are only capable of sensing the touch events, and directly transmit the raw data to a host touch controller for processing of the raw data, so as to determine the positions of the touch events on the touch panel. However, as previously described, as the size of touch panels increase, the amount of sensed data obtained by the touch sensor may increase beyond the maximum throughput of the transmission interface coupled between the touch sensors and host touch controller for transferring the raw data. To solve this problem, in the embodiments of the invention, the touch sensors 102-1 to 102-N may further filter the raw data to generate filtered data. According to an embodiment of the invention, the filtered data may comprise only a portion of raw data with the corresponding sensed values greater than a predetermined threshold. The predetermined threshold may be designed so as to precisely leave the actual touched pixels (such as the groups of the pixels 401, 402, 403 and 404 shown in FIG. 4) after the filtering process. Therefore, the data size of the filtered data may be greatly reduced (i.e. much smaller than the data size of the raw data). In addition, the buffer size of the storage device 301 of the touch controller 103 (which will be introduced in the following paragraphs) may also be reduced and the micro controller unit (MCU) 302 of the touch controller 103 may simply be a general purpose MCU, so that the overall cost of the sensing device is greatly reduced.

Figure 2:
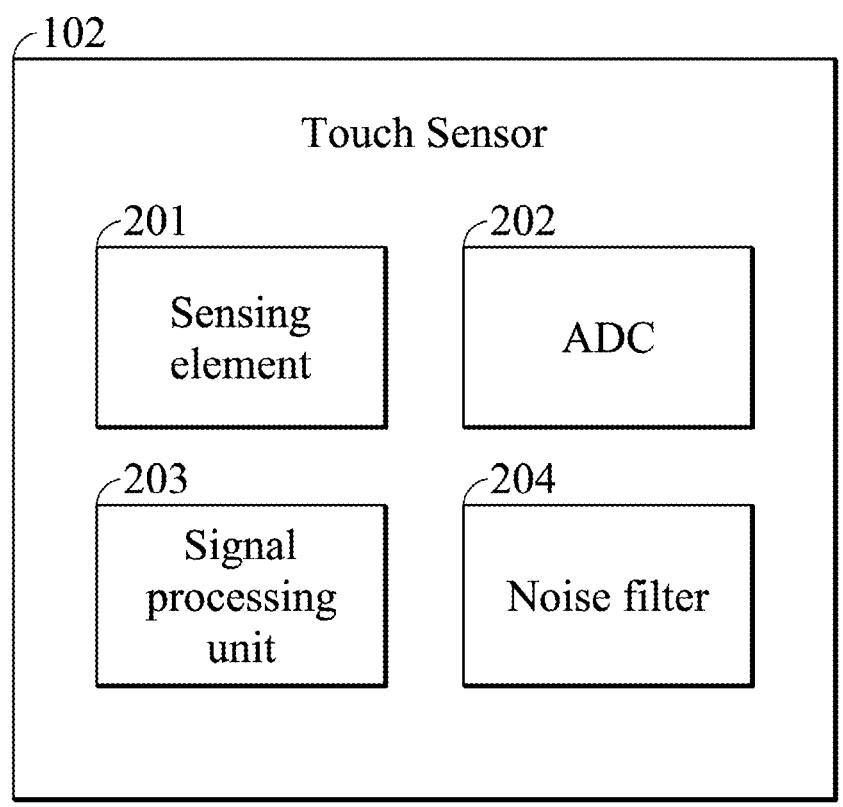
FIG. 2 shows a block diagram of a touch sensor according to an embodiment of the invention.

FIG. 2 shows a block diagram of a touch sensor according to an embodiment of the invention. The touch sensor 102 may comprise a sensing element 201, an analog to digital converter (ADC) 202, a signal processing unit 203 and a noise filter 204. The sensing element 201 is operable to sense the touch events to generate the sensed values. For example, one of the touch sensors (for example, the touch sensor 102-1) may be arranged to output detecting signals to all of scan lines, one after the other, and in response to the corresponding detecting signals, all of the touch sensor(s) may sense the capacitance or resistance at the pixels on the corresponding scan line. After obtaining the sensed value, the ADC 202 may convert the sensed values from an analog format to a digital format to generate the raw data representing the sensed values. The noise filter 204 may filter out a portion of the raw data with the corresponding sensed values which are less than a predetermined threshold to obtain the filtered data, and the signal processing unit 203 may further process the filtered data and transfer the filtered data to the touch controller 103. Note that in some embodiments of the invention, the noise filter 204 may be integrated in the signal processing unit 203 so that the noise filtering process may be directly performed by the signal processing unit 203, and the invention should not be limited thereto.

Referring back to FIG. 1, the touch controller 103 may further receive the filtered data from the touch sensors 102-1 to 102-N and process the filtered data so as to precisely determine the positions of the touch events on the touch panel. For example, the touch controller 103 may be arranged to identify the pixels touched by the fingertip of a user from the groups of the pixels 401, 402, 403 and 404 shown in FIG. 4. The touch controller 103 may comprise a storage device 301 for storing the received filtered data and a micro controller unit (MCU) 302 for processing the received filtered data to identify the precise positions of the touch events.

Figure 3:
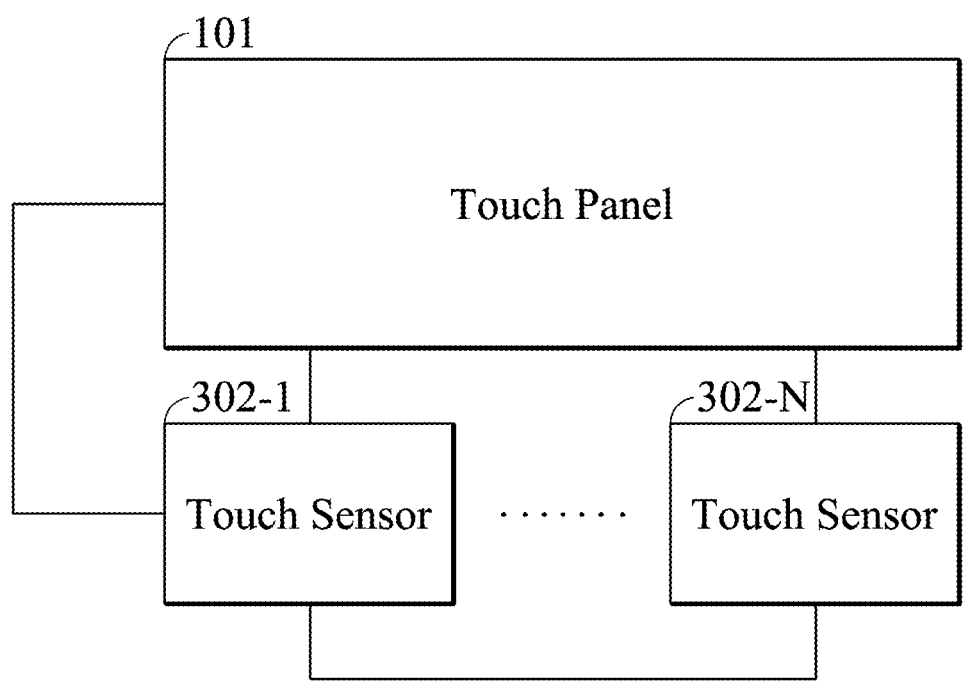
FIG. 3 shows a block diagram of a display system according to another embodiment of the invention.

According to an embodiment of the invention, the touch sensor and the touch controller may be implemented as individual chips. However, according to another embodiment of the invention, the touch sensor and the touch controller may be integrated as a single chip so that functions of the touch controller 103 may further be integrated into one touch sensor. FIG. 3 shows a block diagram of a display system according to another embodiment of the invention. In the embodiment, the functions of the touch controller are integrated into the touch sensor 302-1. In this manner, the other touch sensor(s) (such as the touch sensor 302-N as shown) may transfer the corresponding obtained filtered data to the touch sensor 302-1, and the touch sensor 302-1 may further process the filtered data so as to locate precise positions of the touch events on the touch panel 101.

FIG. 4 shows a schematic diagram of touched pixels on a touch panel according to an embodiment of the invention. According to another embodiment of the invention, besides the filtered data (that is, the raw data of sensed values at the possible touched points, such as the groups of the pixels 401, 402, 403 and 404 in FIG. 4), the raw data of the corresponding sensed values at the border pixels (such as the groups of the pixels 405 and 406) of the touch panel 101 may further be transferred from the corresponding touch sensor to the touch controller 103 or the touch sensor having the functions of a touch controller integrated therein, so as to facilitate identification of the positions of the touch events on the touch panel 101. The purpose of transferring the raw data of the border pixels, no matter whether the corresponding sensed values exceed the predetermined threshold or not, is to help to identify the pixels touched by the fingertip of a user. For example, the pixels at the left hand side of the border B1 may be sensed by a touch sensor and the pixels at the right hand side of the border B1 may be sensed by another touch sensor. When a user touches some pixels around the left hand side of border B1, the touch sensor for sensing the pixels at the right hand side of the border B1 may not detect the touch, but still has to transmit the raw data of the group of the pixels 406 to the touch controller or the touch sensor, so that the precise position of the fingertip of the user may be identified.

Therefore, based on the novel design of the touch sensor, both the output data size of the touch sensor and cost of implementing the sensing device can be greatly reduced.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A sensing device for sensing a touch panel, comprising:
   a touch sensor, for sensing a plurality of touch events on the touch panel to generate raw data representing a plurality of sensed values of a plurality of pixels on the touch panel, and further filtering the raw data to generate filtered data, wherein after filtering, the raw data of a portion of pixels on the touch panel is not remained in the filtered data so that the data size of the filtered data is smaller than the data size of the raw data; and
   a touch controller, for receiving the filtered data from the touch sensor and processing the filtered data so as to determine positions of the touch events on the touch panel.

2. The sensing device as claimed in claim 1, wherein the touch sensor comprises:
   a sensing element, for sensing the touch events to generate the sensed values;
   an analog to digital converter (ADC), for converting the sensed values from an analog format to a digital format to generate the raw data; and
   a signal processing unit, for processing the raw data and filtering out a portion of the raw data with the corresponding sensed values which are less than a predetermined threshold to obtain the filtered data.

3. The sensing device as claimed in claim 1, wherein the touch sensor and the touch controller are integrated as a single chip.

4. The sensing device as claimed in claim 1, wherein the touch sensor and the touch controller are individual chips.

5. The sensing device as claimed in claim 1, wherein the touch sensor further transfers the raw data of the corresponding sensed values at a plurality of border pixels of the touch panel to the touch controller.

6. A sensing module for sensing a touch panel, comprising:
   a plurality of touch sensors, each for sensing a plurality of touch events on the touch panel and comprising:

a sensing element, sensing the touch events to generate a plurality of sensed values of a plurality of pixels on the touch panel;

an analog to digital converter (ADC), converting the sensed values from an analog format to a digital format to generate raw data representing the sensed values; and a signal processing unit, processing the raw data and filtering out a portion of the raw data with the corresponding sensed values which are less than a predetermined threshold to obtain filtered data, wherein after filtering, the raw data of a portion of pixels on the touch panel is not remained in the filtered data so that the data size of the filtered data is smaller than the data size of the raw data.

7. The sensing module as claimed in claim 6, wherein one of the plurality of touch sensors further receives the filtered data from the other touch sensor(s), and processes the filtered data to determine positions of the touch events on the touch panel.

8. The sensing module as claimed in claim 7, wherein the other touch sensor(s) further transfers the raw data of the corresponding sensed values at a plurality of border pixels of the touch panel to the one of the plurality of touch sensors.

9. A sensing module for sensing a touch panel, comprising:

a plurality of touch sensors, each for sensing a plurality of touch events on the touch panel to generate raw data representing a plurality of sensed values of a plurality of pixels on the touch panel, and further filtering the raw data to generate filtered data, wherein after filtering, the raw data of a portion of pixels on the touch panel is not remained in the filtered data so that the data size of the filtered data is smaller than the data size of the raw data, and wherein one of the plurality of touch sensors further receives the filtered data from the other touch sensor(s), and processes the filtered data to determine positions of the touch events on the touch panel.

10. The sensing module as claimed in claim 9, wherein each of the plurality of touch sensors further comprises:

a sensing element, sensing the touch events to generate the sensed values;

an analog to digital converter (ADC), converting the sensed values from an analog format to a digital format to generate the raw data representing the sensed values; and a signal processing unit, processing the raw data and filtering out a portion of the raw data with the corresponding sensed values which are less than a predetermined threshold to obtain the filtered data.

* * * * *